May 27, 1952                J. I. AUSTEN-WALTON                    2,598,206
                                MOUNTING DEVICE
                              Filed Nov. 28, 1949
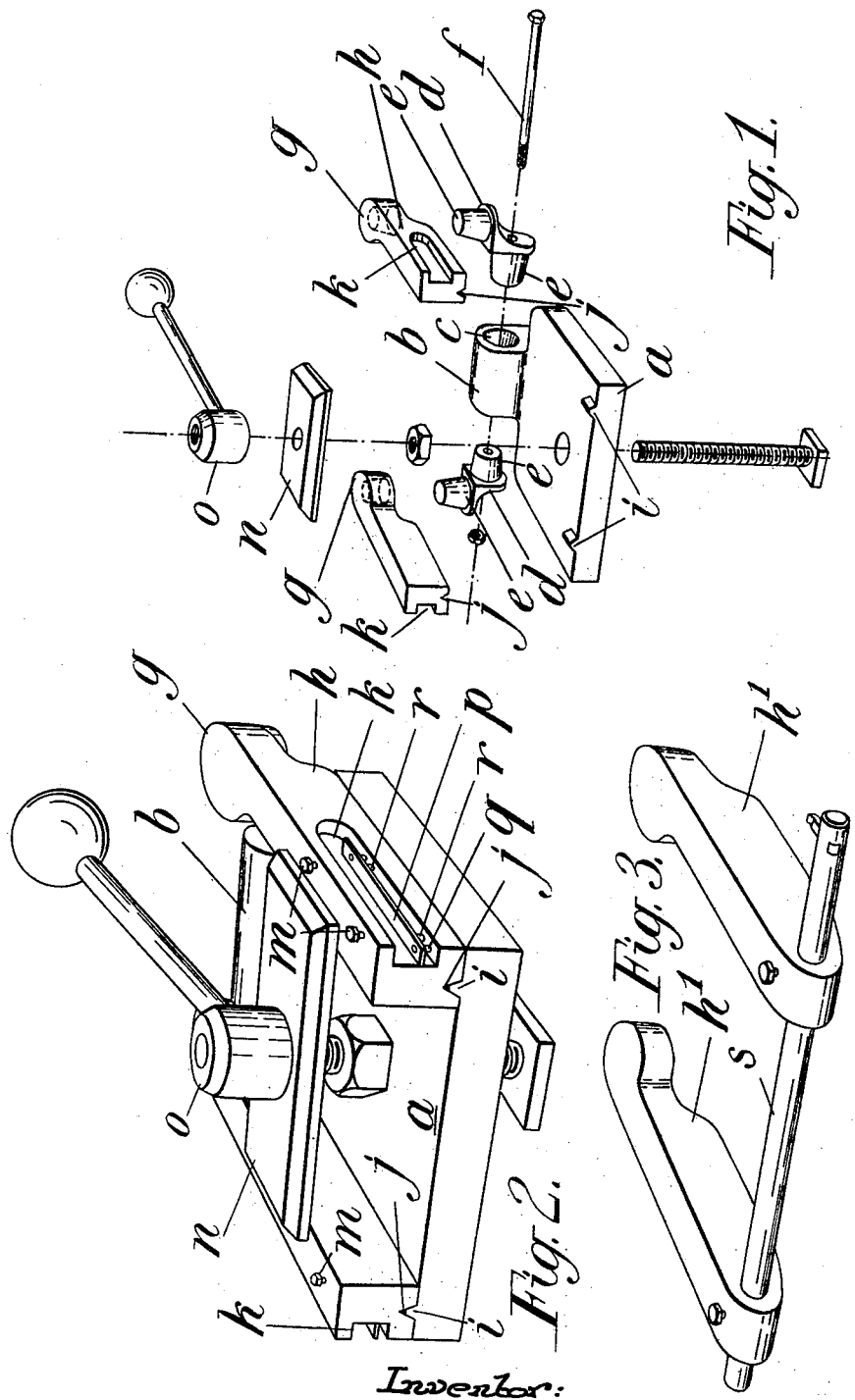
Inventor:
John Ingram Austen-Walton.
by Eugene M. Purdy
            Attorney Patented May 27, 1952

2,598,206

UNITED STATES PATENT OFFICE 2,598,206

MOUNTING DEVICE

John Ingram Austen-Walton, Worthing, England, assignor of one-half to Thomas H. L. Adney, West Worthing, England Application November 28, 1949, Serial No. 129,757
In Great Britain November 30, 1948

6 Claims. (Cl. 82—37)

This invention relates to mounting or supporting devices more particularly, though not exclusively, for holding cutting tools, spindles, dies, chasers or other accessories or attachments in a machine or machine tool.

The object of the present invention is to provide forms of such devices wherein the article to be mounted is supported in a rigid manner but may readily be removed and replaced so that it occupies the exact position it held before removal.

The invention consists in a mounting device incorporating one or more holders or carriers for an article to be mounted, said carrier each embodying a conical abutment surface and a V-shaped ridge or groove constituting a further abutment surface disposed at right angles to the axis of said conical abutment surface, readily releasable clamping means being provided for thrusting said abutment surfaces into contact respectively with a complementary conical abutment surface radially disposed on a member mounted in a conical bearing on a base member and with a complementary V-shaped groove or ridge on said base member disposed at right angles to the axis of said conical bearing.

The invention also consists in a mounting device as set forth in the preceding paragraph, wherein said member mounted in a conical bearing comprises an elbow each limb of which is constituted by a frustum of a cone.

The invention also consists in a mounting device as set forth in the preceding paragraph, wherein one limb of said elbow is bored for reception of a bolt, stud or the like by means of which the member may be clamped rigidly to the base member.

The invention also consists in a mounting device as set forth in any of the three preceding paragraphs, wherein each of said carriers embodies a groove for enabling, say a machining tool, to be clamped therein.

The invention also consists in a mounting device as set forth in the preceding paragraph, wherein said groove accommodates a movable platform having pins slidable in guide holes in one jaw of the carrier.

The invention also consists in a mounting device as set forth in any of its five preceding paragraphs, wherein said means for clamping the carrier or carriers to the base member comprise compressed air, oil or hydraulic piston mechanism.

The invention also consists in mounting devices substantially as hereinafter described with reference to the accompanying drawings.

Referring to the accompanying diagrammatic drawings:

Figure 1 is an exploded view of one convenient form of mounting device embodying the present invention.

Figure 2 is an enlarged perspective view of a detachable tool attachment for use therewith, and Figure 3 illustrates a detachable boring bar attachment for use therewith.

In carrying the invention into effect according to the form illustrated by way of example in Figure 1, a base plate or foundation $a$ is provided having at one end a raised boss or thickened portion $b$ furnished with a horizontal hole $c$ bored therethrough. This hole is tapered from both ends for the reception of a frusto-conical member at each end. Each frusto-conical member comprises two limbs of an elbow $d$ having their axes mutually at right angles, each limb embodying a frusto-conical member $e$. One frusto-conical member $e$ on each elbow $d$ is drilled for the reception of a clamping bolt $f$ passing through the two elbows and serving a to clamp them yieldably but without back-lash in relation to the base plate or foundation.

This arrangement permits the limbs to set themselves with the upper members $e$ in alignment with tapered holes in the heads $g$ of tool carriers $h$ when the latter are clamped thereto.

The base plate is also furnished with a pair of integral V ridges $i$ disposed at right angles to the axis of the bolt $f$ and suitably spaced apart, these ridges constituting abutment surfaces for the holders or carriers $h$. At the ends of each carrier $h$ remote from the heads $g$ V grooves $j$ are provided for engagement with one of the aforesaid V ridges.

Each carrier is provided with a slot or cavity $k$ at one side and clamping screws $m$ or other flexible fixing means for holding, say, a lathe cutting tool in any desired position and the carriers are adapted to be clamped by a clamping plate $n$ and handle nut $o$.

The centre of the base plate is drilled for the reception of a clamping bolt, stud or the like which may conveniently be furnished with a nut for clamping the base plate itself. Co-operating with this bolt or stud is a drilled plate of sufficient length to bridge both carriers, a securing nut with handle being provided for thrusting the plate upon the upper surfaces of the carriage and thus clamping them firmly against a radial elbow limb at one end and a V ridge at the other.

The clamping plate $n$ is capable of being swung around after release of the handle nut in order to clear both carriers and enable them to be lifted away from the base plate.

If desired, the bottom edges of the carrier grooves or slots may be furnished each with a metal platform $p$ (Figure 2) furnished with depending pins $q$ engaging guide holes in the bottom jaw of the cavity $k$, the platform resting upon adjusting screws $r$, thus providing an adjustable packing device devoid of loose packing material.

Once a tool or attachment has been set up, it may be removed together with its carrier and replaced in the exact position it held before removal by mere removal and replacement of the carrier.

On account of the conical bearings supporting one limb of each of the elbows, and on account of the conical engagement between the radial limbs and the carrier ends in conjunction with the V ridges and grooves, the carriers are held with self-adjustment and perfect equilibrium unaffected by frequent removal and replacement of the parts, this action being independent of possible wear in the engaging surfaces and of expansion due to strain or temperature variations.

Carriers may if desired be provided with holes or clamps in order to give support to bars or spindles held either vertically or horizontally as desired. In Figure 3 a boring bar $s$ is so supported on carriers $h'$.

Instead of employing a pair of carriers, one single carrier may be employed and rollers or curved self-centering devices which do not apply any bias to the clamping may be incorporated.

If desired compressed air, oil or hydraulic piston mechanism may be employed for effecting the clamping of the carrier or carriers.

Mounting devices embodying the present invention may be employed for holding delicate instruments or measuring devices where exact and firm location is required coupled with the ability to mount and replace the instruments used without deviation from a desired position.

I claim:

1. A mounting device incorporating at least one holder or carrier for an article to be mounted, said carrier embodying a conical abutment surface and a V-shaped groove constituting a further abutment surface disposed at right angles to the axis of said conical abutment surface, readily releasable clamping means being provided for thrusting said abutment surfaces into contact respectively with a complementary conical abutment surface disposed on a member mounted in a conical bearing on a base member and with a complementary V-shaped ridge on said base member disposed at right angles to the axis of said conical bearing.

2. A mounting device as claimed in claim 1, wherein said member mounted in a conical bearing comprises an elbow each limb of which is constituted by a frustum of a cone.

3. A mounting device as claimed in claim 1, said member mounted in a conical bearing comprises an elbow each limb of which is constituted by a frustum of a cone and wherein one limb of said elbow is bored for reception of a clamping device by means of which the member may be clamped rigidly to the base member.

4. A mounting device as claimed in claim 1, wherein each of said carriers embodies a groove for enabling, say a machining tool, to be clamped therein.

5. A mounting device as claimed in claim 1, wherein each of said carriers embodies a groove for enabling, say a machine tool, to be clamped therein and wherein said groove accommodates a movable platform having pins slidable in guide holes in one jaw of the carrier.

6. A mounting device incorporating at least one holder or carrier for an article to be mounted, said carrier embodying a conical abutment surface and a V-shaped ridge constituting a further abutment surface disposed at right angles to the axis of said conical abutment surface, readily releasable clamping means being provided for thrusting said abutment surfaces into contact respectively with a complementary conical abutment surface disposed on a member mounted in a conical bearing on a base member and with a complementary V-shaped groove on said base member disposed at right angles to the axis of said conical bearing.

JOHN INGRAM AUSTEN-WALTON.

REFERENCES CITED

The following references are of record in the file of this patent:

UNITED STATES PATENTS

| Number | Name | Date |
|---|---|---|
| 1,189,926 | Ellis | July 4, 1916 |
| 1,268,969 | Harding | June 11, 1918 |
| 1,688,284 | Mileez | Oct. 16, 1928 |